March 6, 1962 R. T. BRASHEAR 3,023,835
THERMOCHROMATOGRAPHIC ANALYZER HEATER
Filed Oct. 20, 1958 2 Sheets-Sheet 1
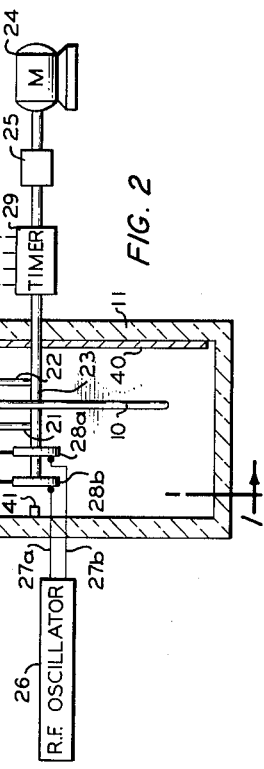
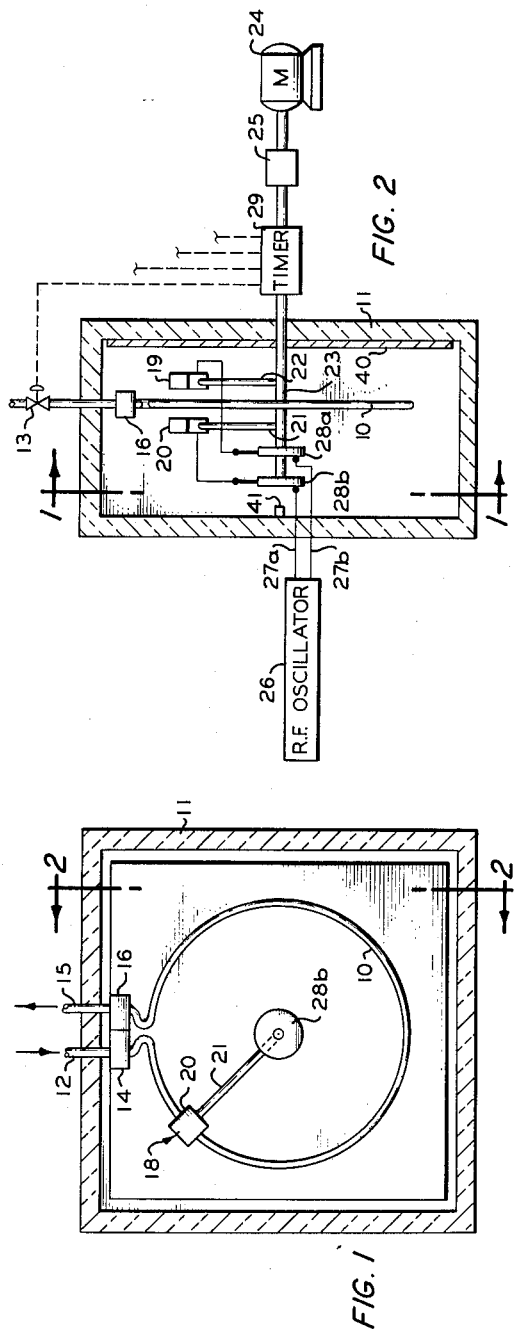
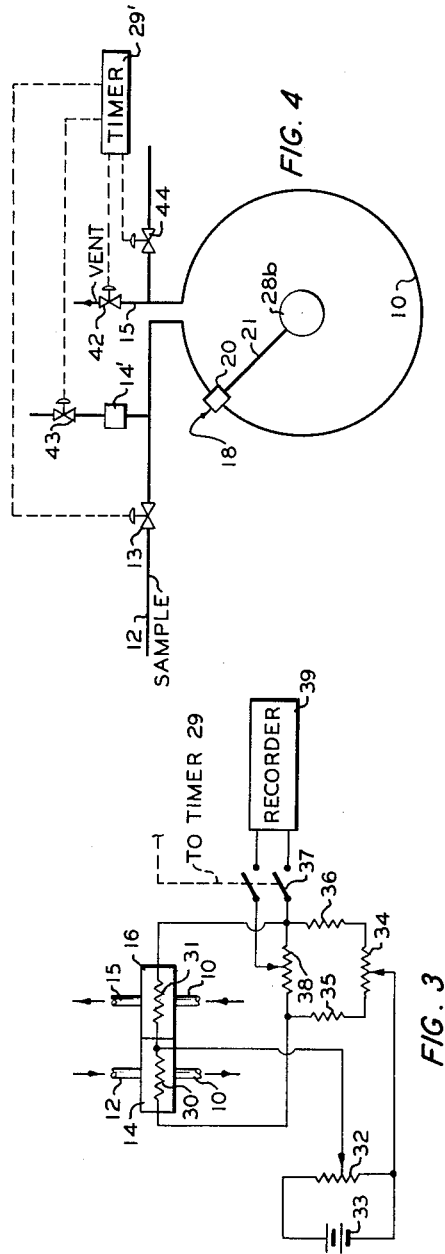
INVENTOR.
R.T. BRASHEAR
BY Hudson & Young
ATTORNEYS March 6, 1962 R. T. BRASHEAR 3,023,835
THERMOCHROMATOGRAPHIC ANALYZER HEATER
Filed Oct. 20, 1958 2 Sheets-Sheet 2

INVENTOR.
R.T. BRASHEAR
BY Hudson & Young
ATTORNEYS

United States Patent Office 3,023,835
Patented Mar. 6, 1962

3,023,835
THERMOCHROMATOGRAPHIC ANALYZER HEATER
Roy T. Brashear, Bartlesville, Okla., assignor to Phillips Petroleum Company, a corporation of Delaware
Filed Oct. 20, 1958, Ser. No. 768,235
3 Claims. (Cl. 183—2)

This invention relates to an improved method and apparatus for effecting chromatographic analysis. In one specific aspect it relates to improvements in heating means whereby a thermochromatographic effect is employed to separate constituents in a fluid mixture for a subsequent analysis.

One mode of analyzing fluid mixtures is the technique of thermochromatography. In this a fluid sample is admitted to a column comprising an elongated conduit filled with a material which selectively retards (by sorption mechanism) passage therethrough of the constituents of a fluid mixture to be analyzed. A temperature gradient is then established along a portion of the column. The heating changes the equilibrium conditions under which the fluid to be analyzed is sorbed, i.e., adsorbed or absorbed, on the filler in the column. When these conditions are changed the various components or groups thereof will elute (desorb). Elution is maintained by moving the temperature gradient along the column. When the components elute individually, they may be analyzed in various ways, such as infrared or ultraviolet analyses, by a refractometer, but preferably the components are analyzed by a thermal conductivity cell. When the components elute as a group it is generally the practice to again submit them to separation in a second chromatographic column in order to separate them into their individual components. However, at times it is desired to measure such elements that do elute in a group, and as a group.

This invention is directed to improvements in the heating method and means. Specifically it relates to subjecting a column, filled with a sorbent material that retards passage through the column of the constituents of the fluid mixture to be analyzed, being subjected to a radio frequency field. In one embodiment the chromatographic column is subjected to a dielectric field. In another embodiment the column is subjected to induction heating. In the respective embodiments the column is brought into electrical association with either a condenser or a coil.

Accordingly it is an object of this invention to provide a method for desorbing materials from the sorbent in a chromatographic column by dielectric heating; it is another object to provide a method of desorbing constituents of materials to be analyzed from such a sorbent by induction heating. It is another object to provide apparatus for desorbing materials by induction heating, and it is still another object to provide apparatus for desorbing fluids by subjecting them to dielectric heating.

Other objects, advantages and features of this invention should become apparent from the following detailed description which is taken in conjunction with the accompanying drawing in which:

FIGURE 1 is a view, shown partially in section of the thermochromatographic analyzer of this invention.

FIGURE 2 is a view taken along line 2—2, FIGURE 1.

FIGURE 3 is a schematic circuit drawing of the thermal conductivity cell measuring apparatus employed in the analyzer of FIGURE 1.

FIGURE 4 is another embodiment of the invention showing schematically the valving arrangement.

Figure 5:
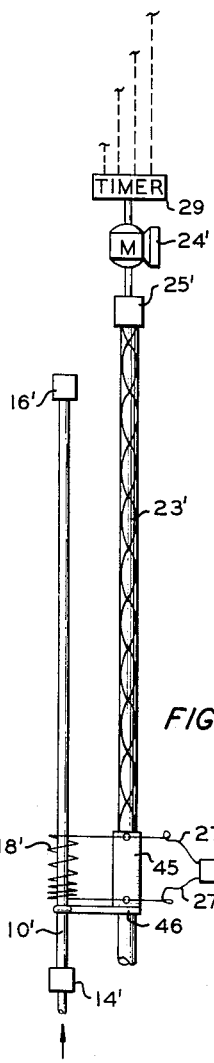
FIGURE 5 is still another embodiment of the invention showing the arrangement for employing induction heating.

Referring now to the drawing in detail, and to FIGURES 1 and 2 in particular, there is shown an elongated conduit 10 of circular configuration which is disposed within a housing 11 formed of heat insulating material. An inlet conduit 12, having a sampling valve 13 and a thermal conductivity cell 14 disposed therein communicates with the first end of conduit 10. An outlet conduit 15, having a second thermal conductivity cell 16 therein, communicates with the second end of conduit 10. Conduit 10 is filled with a material which selectively retards passage therethrough of the constituents of a fluid mixture to be analyzed. This column can be filled with an absorbent material, such as silica gel, alumina or charcoal, or with an inert solid, such as pulverized brick which is coated by a solvent such as hexadecane or benzyl ether. A fluid mixture to be analyzed, either alone or mixed with a carrier gas, such as helium, hydrogen, nitrogen, air or argon, is introduced into the system through conduit 12.

A heating element 18 comprises two condenser plates (electrodes) 19 and 20 which are mounted adjacent conduit 10 by means of respective supports 21 and 22 which extend from a shaft 23 that is coaxial of the axis of the circle formed by conduit 10. Heating element 18 is rotated about conduit 10 by rotation of shaft 23 which is connected to the drive shaft of a motor 24 through speed reduction gears 25. It should be evident that other configurations of heating element, such as a straight or a U-shaped element, for example, can be employed.

The column 10 may be of glass or metal although other materials may possibly be used. If the column is made of glass, it as well as the filler therein will have a dielectric or insulating effect when used in conjunction with the heater 18. If this heater is a condenser as shown, the column will heat internally where the heat is more directly applied to the fluids to be analyzed because the filler will begin to heat, as well as externally. On the other hand, if the column is made of metal and is used in conjunction with a coil for induction heating (FIGURE 5), the column proper will get hot first and heat for elution must then rely on conduction through the filler. When used with a coil the filler should contain some amount of powdered metal in order to aid the conduction of heat therethrough. A soft iron or other magnetic material of particle size large enough to permit inductive heating can also be used. It is preferred when the column is used in conjunction with a condenser as shown in FIGURE 1, that the column itself be constructed of a non-metal such as a ceramic glass tube, i.e., a low loss material having a dielectric constant near that of the column filler. It is suggested that the column be coated in order to make it highly emissive of radiant heat in order that rapid cooling can take effect once the heating means has passed over a given portion of the column. On the other hand, it is definitely preferred that the column be a metal having magnetic properties (e.g., high in nickel or iron content) when used in conjunction with the coil. Referring to FIGURE 2 there is also shown a radio frequency oscillator 26 connected by leads 27a and 27b to brushes 28a and 28b respectively. These respective brushes are connected to the condenser plates 18 and 20 respectively. The oscillator is preferably an ultra high frequency type such as the split anode negative resistance magnetron or modification thereof as described on pages 407–408 of "Radar Electronic Fundamentals," NAVSHIPS 900,016, U.S. Government Printing Office, dated June 1944 (not classified). This oscillator is tunable, capable of producing large power outputs at high frequencies, and is susceptible to increases in output upon the addition of a cooling system. A timer 29 is disposed on the shaft 23 and is used to operate the various valves such as 13 and to connect the analyzer to a recorder when it is desired as noted with respect to FIGURE 3. Alternatively, a non-tunable oscillator of lower frequency and power may be suitable for use with a condenser. Such oscillators are described in "IRE Transactions on Industrial Electronics," PGIE-2, March 1955, pp. 61–68.

The desorbed constituents can be detected by comparing the thermal conductivity of the effluent gas with the thermal conductivity of the sample mixture initially supplied to the column or with the carrier gas. This comparison can be made by means of thermal conductivity cells 14 and 16 and the associated circuit which is illustrated in FIGURE 3. Cells 14 and 16 have respective thermistors 30 and 31 therein which are in thermal contact with the gases flowing through respective conduits 12 and 15, although filament type thermal conductivity cells can also be used. The first terminals of thermistors 30 and 31 are connected to one another and to the contactor of a potentiometer 32. A voltage source 33 is connected across the end terminals of potentiometer 32. One end terminal of potentiometer 32 is connected to the contactor of a potentiometer 34. The first end terminal of potentiometer 34 is connected through a resistor 35 to the second terminal of thermistor 30, and the second end terminal of potentiometer 34 is connected through a resistor 36 to the second terminal of thermistor 31. The end terminals of a potentiometer 38 are connected to the respective second terminals of thermistors 30 and 31. The contactor and one end terminal of potentiometer 38 are connected through timer operated switch 37 to the respective input terminals of a recorder 39.

It should thus be evident that thermistors 30 and 31 and the circuit elements associated therewith form a modified Wheatstone bridge network so that the signal applied to recorder 39 is representative of the difference between the thermal conductivities of the gases in contact with respective thermistors 30 and 31. Recorder 39 thus provides a signal which indicates differences between compositions of the gases flowing through conduits 12 and 15. While a thermal conductivity cell detector is particularly well suited for use in the analyzer of this invention, other types of analyzers can be employed to detect the difference in composition of the gases flowing through conduits 12 and 15. Examples of such analyzers include glow discharge tubes, differential refractometers, infrared analyzers and ultraviolet analyzers.

Except for the region of conduit 10 adjacent heating element 18, it is desirable that conduit 10 and thermal conductivity cells 14 and 16 be maintained at a constant temperature. This can readily be accomplished by disposing a heating element 40 within housing 11. Heating element 40 can comprise an electrical heater or a conduit through which a heating material can be circulated. The electrical energy or heating material supplied to this element can be regulated by a thermostat 41 to maintain a constant temperature within housing 11.

In FIGURE 4 there is shown one embodiment of the thermochromatographic column having a carrier gas control valve 43 feeding through the sample cell 14'. In this drawing prime numbers represent slight modifications as to application or structure of those shown in FIGURES 1 and 2.

The drawing also shows vent valve 42 and an analyzing valve 44, the latter for directing eluted samples from the column 10 to analyzing means or to further separating means prior to analyses. In the case of the valves, all of them are controlled in a preselected time sequence by the timer 29'. This sequence preferably is to first open the sample valve 13 and take a measured amount of fluid for a sample then to close it. Next the carrier gas valve 43 opens to increase carrier gas flow through the column to aid in eluting constituents therefrom. The vent valve 42 is closed during this process and the valve 44 is opened. At the end of the eluting operation the valve 44 is closed and vent 42 is opened. It may be preferred to increase the flow of carrier gas through 43 once 42 is opened in order to clean up the column 10 more rapidly.

Referring now to FIGURE 5 there is shown the arrangement for employing a coil to inductively heat a chromatographic column. In this drawing prime numbers refer to those elements serving the same purpose as those in FIGURES 1 and 2. The electrical circuit remains substantially the same. In this figure the chromatographic column 10' is straight and is surrounded at a portion thereof by coil 18' which constitutes the heating element. This coil is mounted on a support member 45 which has a bracket 46 secured thereto. The bracket slidably engages at least a portion of the periphery of the column 10'. Member 45 is mounted on a helical screw member 23'. This member is driven by the motor 24'. The helical screw is designed quite similarly to the level line attachment on a bait casting reel and enables the member 45 to move vertically up the column during an elution operation and then to be returned to the bottom thereof after the eluting has taken place. This is done without reversing direction of rotation of the member 23'. If desired, a fast return mechanism can be provided either by a timed gear shift means or by changing the pitch of the helices for the return operation.

Figure 6:
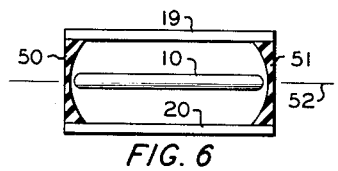
FIGURES 6, 7 and 8 show various constructions of the heaters in order that desired temperature gradients may be maintained. Throughout the drawings, the same reference numerals refer to the same elements.
Figure 7:
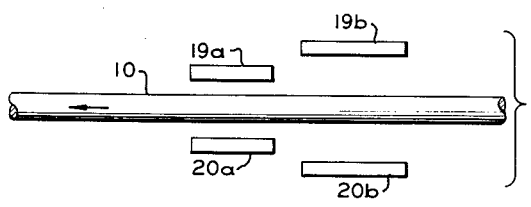

FIGURES 6 and 7 show detail and design of the column for use in conjunction with a condenser for heating it. Here the main problem is to provide an even distribution of heat across the radius or equivalent dimension of the column. It is also desired to maintain a linear temperature gradient along the heater. As shown in FIGURE 6 these objects may be accomplished by providing a flattened column 10 and shaping the dielectric insulators 50 and 51 that separate the plates 19 and 20 so that a substantially equal insulating effect is realized on the horizontal dimension across the center line 52. In FIGURE 7 a plurality of condenser plates 19a, 19b and 20a, 20b are provided. The spacing and plate length of respective pairs (19a, 20a, etc.) is varied longitudinally along the conduit 10 in order that a substantially linear temperature change may be realized. Another technique for accomplishing this is to taper the longitudinal thickness of a dielectric insulator (e.g. 50, 51) between the plates 19 and 20.

Figure 8:
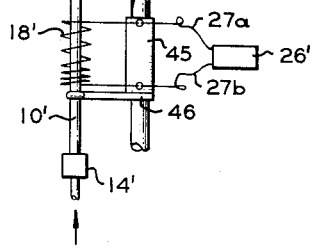

In FIGURE 8 there is shown the spacing on the coils of an induction heater 18'. Here again the problem is to achieve the linear temperature gradient along the heater and this is accomplished by varying the spacing in order that a lower temperature may exist downstream with the higher temperature upstream, i.e., at the leading and trailing edges of the heater respectively.

The operation of the system should now be evident. The motor 24, which is preferably a synchronous motor, is started and initially admits fluid to the column 10 through valve 13. Then the timer turns on the oscillator 26 (by a switch, not shown) and operates other valves such as 43 (open), 42 (closed), and 44 (open). The heaters are moved progressively around the column 10 (or along 10; FIGURE 5) from the point adjoining cell 14 to the point adjoining cell 16 at a rate such as to elute the desired components or groups from the column. Control of the heat applied may be accomplished either by regulating the amplitude of the oscillations or by turning the oscillator on and off at various intervals or preselected intervals.

The operation of the apparatus of FIGURE 5 is quite similar to the foregoing. The motor 24' operates the various valves by means of timer 29 and admits a sample to the column. The shaft 23' is rotated and moves the coil 18' vertically up the column until it is adjacent the cell 16'. At this time the oscillator can be disconnected from the heater by a timer operated switch and the heater returned to its starting position.

It is preferred to use the system employing the capacitors such as shown in FIGURES 1 and 2 because this supplies the heat specifically to the point where it is needed most, i.e., on the column filler where it immediately heats the fluid being separated for analysis. This gives the advantage of sharper resolution between components or groups thereof and provides for an improved temperature gradient especially when used in conjunction with shaped electrodes such as shown in FIGURES 6 and 7.

As previously explained, rough and fine separations may be accomplished. In the rough separation a group of components is eluted together. In the fine separation an individual component is eluted.

In the following claims when I refer to a "sorbent" I refer to the solid filler in the column which is a material that selectively retards passage therethrough of fluids introduced at one end of the column. When I refer to such a material as having dielectric properties I mean a material which has insulating properties creating a dielectric effect when disposed between the plates of the condenser, such term being well known to those skilled in the electrical art. When I refer to such a material as having a powdered metal therein I mean a metal such as aluminum, silver, copper or the like. Such a material should be selected so that it does not react with fluids to be admitted to the column.

While I have shown my invention with respect to certain specific embodiments and described certain specific details, I do not wish to be limited to those as described in the drawings and accompanying specification but wish to incluude as my invention all the subject matter reasonably apparent to one skilled in the art from the teaching herein.

I claim:

1. The combination of a chromatographic column filled with a material having dielectric properties, said material capable of selectively retarding the passage therethrough of fluids, the axis of said column forming a circular loop, a condenser having a portion of said column disposed between its plates, means for moving said condenser along the longitudinal axis of said column, said means for moving comprising a rotatable arm with said condenser mounted at one end of said arm, a radio-frequency oscillator connected to the plates of said condenser, and means for maintaining said column at an elevated temperature before and after moving said condenser.

2. Apparatus comprising in combination a column filled with a material which selectively retards the passage therethrough of the constituents of a fluid mixture to be analyzed, first conduit means for introducing a fluid mixture to one end of said column, means of measuring the thermal conductivity of a fluid flowing through said first conduit means, second conduit means communicating with the other end of said column, means of measuring the thermal conductivity of a fluid flowing through said second conduit means, a heating element surrounding a portion of said column, said heating element consisting of coils spaced at varying intervals so as to provide a linear temperature gradient along said heating element, means for applying radio-frequency power to said heating element, and means for moving said heating element along said column.

3. Apparatus comprising, in combination, a column filled with dielectric material which selectively retards the passage therethrough of the constituents of a fluid mixture to be analyzed, first conduit means for introducing the fluid mixture to one end of said column, means of measuring the thermal conductivity of the fluid flowing through said first conduit means, second conduit means communicating with the other end of said column, means of measuring the thermal conductivity of the fluid flowing through said second conduit means, a heating element comprising pairs of plate condensers mounted with a portion of said column disposed between each said pair of condenser plates, each said pair of condenser plates of varying length and spacing from said column so as to provide a linear temperature gradient along said column, and means for applying radio-frequency power to each said pair of condenser plates.

References Cited in the file of this patent

UNITED STATES PATENTS

| 2,147,689 | Chaffee | Feb. 21, 1939 |
| 2,182,341 | Hulster | Dec. 5, 1939 |
| 2,398,817 | Turner | Apr. 23, 1946 |
| 2,555,450 | Lee | June 5, 1951 |